Patented July 2, 1946

2,402,942

UNITED STATES PATENT OFFICE 2,402,942

CELLULOSE DERIVATIVE COMPOSITIONS

Joseph E. Bludworth, Cumberland, Md., assignor to Celanese Corporation of America, a corporation of Delaware No Drawing. Application February 13, 1941, Serial No. 378,741

7 Claims. (Cl. 18—57)

This invention relates to the preparation of materials comprising derivatives of cellulose, and relates more particularly to the preparation of plastics, yarns, films, foils and other materials containing organic derivatives of cellulose and having improved properties.

An object of my invention is to prepare plastic compositions having a basis of an organic derivative of cellulose which are clear, flexible and have superior strength.

Another object of my invention is to prepare plastic compositions having a basis of an organic derivative of cellulose which have polymerized therein resins formed by the polymerization of monomeric and partially polymerized resin-forming unsaturated organic compounds.

Other objects of my invention will appear from the following detailed description.

Plastic compositions comprising organic derivatives of cellulose have many desirable properties which render them very suitable for use in the plastic arts. When formed into films or foils, for example, they may be used as packaging materials, as photographic film bases, and for numerous other uses where a clear, flexible material is desired. In some applications, however, where such films and foils are subject to hard usage, they are not as strong as is often desired.

I have now found that plastic materials, and particularly films and foils comprising organic derivatives of cellulose having notably increased strength, may be prepared by adding a monomeric or partially polymerized unsaturated resin-forming organic compound to a solution of an organic derivative of cellulose in a volatile solvent, and then, after shaping the solution and causing the removal of the solvent, treating the resulting shaped plastic so as to cause the resin-forming unsaturated organic compound contained therein to undergo further polymerization.

While I prefer to employ monomeric or partially polymerized methacrylic acid esters in said solution, other monomeric or partially polymerized, unsaturated resin-forming organic compounds, such as, for example, substituted vinyl compounds, vinyl acid esters and inter-polymerizable mixtures of vinyl acid esters and halogenated vinyl compounds, may also be used. Examples of suitable resin-forming vinyl derivatives are styrene, vinyl acetate and inter-polymerizable mixtures of vinyl chloride and vinyl acetate, while examples of suitable monomeric or partially polymerized methacrylic acid esters are the esters of methacrylic acid with the mono-ethyl ether of ethylene glycol, the mono-butyl ether of ethylene glycol, the mono-ethyl ether of diethylene glycol, 1:3-butylene glycol monomethyl ether, the mono-butyl ether of diethylene glycol, diacetone alcohol, the mono-methyl ether of tetraethylene glycol, diethyl-amino ethanol, and with compounds having more than one free hydroxy group, such as tetraethylene glycol.

In preparing the solutions, various organic derivatives of cellulose may be employed. While I prefer to employ cellulose acetate, other organic esters and ethers of cellulose are suitable. Examples of organic esters of cellulose are cellulose propionate, cellulose butyrate, and mixed esters such as cellulose acetate-propionate and cellulose acetate-butyrate, while examples of organic ethers of cellulose are ethyl cellulose and benzyl cellulose.

The solutions formed in accordance with my invention comprise cellulose acetate or other organic derivative of cellulose and the monomeric or partially polymerized unsaturated resin-forming organic compound dissolved in a volatile solvent, such as acetone. The resin-forming compound may be added to the solution in varying amounts. In the case of cellulose acetate, films and foils, for example, may be prepared containing up to 100%, based on the weight of the cellulose acetate, of the methacrylate of the mono-ethyl ether of ethylene glycol. Other methacrylates are more or less equally as compatible. Preferably, in connection with the methacrylate of the monomethyl ether of ethylene glycol, I use from 20% to 40% of the monomeric or partially polymerized methacrylate based on the weight of the organic derivative of cellulose contained in the solution. Besides acetone, examples of other volatile solvents which may be used are ethyl alcohol, acetone and ethyl or methyl alcohol, and methyl chloride and ethyl or methyl alcohol.

Solutions, thus formed, may be employed as a lacquer or coating composition for metal, glass or other surfaces and may also be used for making films, foils and other sheet-like materials. Artificial yarns may be formed by extruding solutions containing the organic derivative of cellulose and the unsaturated resin-forming organic compound through orifices of a spinnerette, either into a heated evaporative atmosphere as in dry spinning, or into a precipitating bath as in wet spinning. The solution may also be employed as an adhesive, and is particularly useful in this connection for making shatterless glass by causing clear plastic sheets to adhere to the surfaces of sheets of glass between which they are placed.

The plastic compositions containing organic derivatives of cellulose and the unsaturated resin-forming organic compound may be formed into sheets which may be used for laminating glass and other materials, and they also may be formed into blocks from which sheets and other shapes may be cut. Also, such compositions may be used to form articles in the manner employed in connection with other plastics.

Sheet-like materials made in accordance with my invention may be thin foils having a thickness of the order of 0.001" and which may be used for wrapping articles and other suitable purposes, or they may be films having a thickness of 0.003" or more to be used for various purposes, such as, photographic film base, or for laminating glass, as stated above. These sheet-like materials may be made by casting or flowing a solution of the organic derivative of cellulose made in accordance with my invention on to smooth metallic or glass surfaces, such as those of film wheels, bands, tables, etc. as is well known in the art.

The polymerization of the resin-forming material in the formed sheet film or article may be carried out in any suitable manner, such as by exposure of the shaped articles to heat and/or light, such as ultra-violet light, or by the addition of certain agents to the solution which catalyze the polymerization when the product is heated. These catalytic agents are preferably those which are capable of yielding free oxygen such as organic peroxides and ozonides, examples of suitable agents being benzoyl peroxide, acetyl peroxide and hydrogen peroxide. The polymerizing agents may be added to the solution in amounts varying from about .01% to 1.0% or more on the weight of the methacrylate contained there, preferably, in amounts from 0.1% to 0.5%. The shaped articles may be heated to temperatures of about 50° C. to 110° C. for from ¼ to 3 hours, the higher the temperature and the thinner or smaller the article, the shorter may be the time of heating. The heating may be carried out by any suitable means or in any suitable apparatus. Desirable results are obtained in heating a film or foil by passing it continuously through a chamber in which heated air is circulated.

In order further to illustrate my invention but without being limited thereto, the following examples are given:

Example I

A solution or dope is made up as follows:

| | Parts by weight |
|---|---|
| Cellulose acetate | 10 |
| Monomeric methacrylate of the mono-ethyl ether of ethylene glycol | 4 |
| Benzoyl peroxide | .004 |
| Acetone | 86 |

This solution is cast upon the polished periphery of a wheel to form a layer which produces, upon drying, a film having a thickness of 0.003". This film is heated in an enclosed heating chamber to a temperature of 85° C. and is maintained at that temperature for 1 hour until the methacrylate monomer is completely polymerized. The resulting film is clear, flexible and has substantially 100% more resistance to breaking than a film of cellulose acetate of the same thickness prepared in the usual way and containing plasticizers, such as the dimethyl ether of ethylene glycol phthalate.

Example II

A spinning dope is made up as follows:

| | Parts by weight |
|---|---|
| Cellulose acetate | 25 |
| Monomeric methacrylate of the mono-ethyl ether of ethylene glycol | 10 |
| Benzoyl peroxide | .01 |
| Acetone | 75 |

The charge is mixed to a homogeneous, clear solution and then extruded through orifices into an evaporative atmosphere to form filaments of fine denier which are associated together by twisting to form a yarn. The yarn so formed is then subjected to a temperature of 75° C. for 30 minutes until the methacrylate monomer is polymerized. The resulting yarn has an increased breaking strength, is flexible and may be knitted or woven into fabrics which drape well and have a soft hand.

It is to be understood that the foregoing detailed description is merely given by way of illustration and that many variations may be made therein without departing from the spirit of my invention.

Having described my invention, what I desire to secure by Letters Patent is:

1. Process for the production of shaped articles having a basis of a carboxylic acid ester of cellulose, which comprises forming a solution of a carboxylic acid ester of cellulose and an alkylated glycol ester of methacrylic acid capable of polymerization in a volatile solvent in the absence of plasticizer, shaping said solution, removing the volatile solvent therefrom by evaporation leaving a shaped article consisting of a substantially homogeneous mixture of said organic derivative of cellulose and said alkylated glycol ester of methacrylic acid and then treating the shaped article so as to cause polymerization of the ester of methacrylic acid.

2. Process for the production of shaped articles having a basis of cellulose acetate, which comprises forming a solution of cellulose acetate and an alkylated glycol ester of methacrylic acid capable of polymerization in a volatile solvent in the absence of plasticizer, shaping said solution, removing the volatile solvent therefrom by evaporation leaving a shaped article consisting of a substantially homogeneous mixture of said cellulose acetate and said alkylated glycol ester of methacrylic acid and then treating the shaped article so as to cause polymerization of the ester of methacrylic acid.

3. Process for the production of shaped articles having a basis of a carboxylic acid ester of cellulose, which comprises forming a solution of a carboxylic acid ester of cellulose and a monomeric alkylated glycol ester of methacrylic acid in a volatile solvent in the absence of plasticizer, shaping said solution, removing the volatile solvent therefrom by evaporation leaving a shaped article consisting of a substantially homogeneous mixture of said organic derivative of cellulose and said alkylated glycol ester of methacrylic acid and then treating the shaped article so as to cause polymerization of the ester of methacrylic acid.

4. Process for the production of shaped articles having a basis of cellulose acetate, which comprises forming a solution of cellulose acetate and a monomeric alkylated glycol ester of methacrylic acid in a volatile solvent, shaping said solution in the absence of plasticizer, removing the volatile solvent therefrom by evaporation leaving a shaped article consisting of a substantially homogeneous mixture of said cellulose acetate and said alkylated glycol ester of methacrylic acid and then treating the shaped article so as to cause polymerization of the ester of methacrylic acid.

5. Process for the production of shaped articles having a basis of a carboxylic acid ester of cellulose, which comprises forming a solution of a carboxylic acid ester of cellulose, 20 to 40%, based on the weight of the cellulose ester of a partially polymerized alkylated glycol ester of methacrylic acid in a volatile solvent in the absence of plasticizer, shaping said solution, removing the volatile solvent therefrom by evaporation leaving a shaped article consisting of a substantially homogeneous mixture of said organic derivative of cellulose and said alkylated glycol ester of methacrylic acid and then treating the shaped article so as to cause further polymerization of the ester of methacrylic acid.

6. Process for the production of shaped articles having a basis of cellulose acetate, which comprises forming a solution of cellulose acetate, a partially polymerized alkylated glycol ester of methacrylic acid in a volatile solvent in the absence of plasticizer, shaping said solution, removing the volatile solvent therefrom by evaporation leaving a shaped article consisting of a substantially homogeneous mixture of said cellulose acetate and said alkylated glycol ester of methacrylic acid and then treating the shaped article so as to cause further polymerization of the ester of methacrylic acid.

7. Process for the production of shaped articles having a basis of acetone soluble cellulose acetate, which comprises forming a solution of cellulose acetate, a methacrylic acid ester of the monoethyl ether of ethylene glycol capable of polymerization in acetone in the absence of plasticizer, shaping said solution by passing the same through orifices, removing the acetone therefrom by evaporation leaving a shaped article consisting of a substantially homogeneous mixture of said cellulose acetate and said methacrylic acid ester of the mono-ethyl ether of ethylene glycol and then heating the shaped article so as to cause polymerization of the methacrylic acid ester.

JOSEPH E. BLUDWORTH.